US011453199B2

(12) United States Patent
Fujii et al.

(10) Patent No.: US 11,453,199 B2
(45) Date of Patent: Sep. 27, 2022

(54) LAMINATE AND REINFORCING SHEET

(71) Applicant: NITTO DENKO CORPORATION, Ibaraki (JP)

(72) Inventors: Takahiro Fujii, Ibaraki (JP); Toru Tagami, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 120 days.

(21) Appl. No.: 16/760,578

(22) PCT Filed: Oct. 29, 2018

(86) PCT No.: PCT/JP2018/040057
§ 371 (c)(1),
(2) Date: Apr. 30, 2020

(87) PCT Pub. No.: WO2019/088009
PCT Pub. Date: May 9, 2019

(65) Prior Publication Data
US 2020/0346430 A1    Nov. 5, 2020

(30) Foreign Application Priority Data
Nov. 1, 2017  (JP) .............................. JP2017-211874

(51) Int. Cl.
*B32B 5/24*    (2006.01)
*B32B 7/09*    (2019.01)
(Continued)

(52) U.S. Cl.
CPC ................ *B32B 5/24* (2013.01); *B32B 5/024* (2013.01); *B32B 7/09* (2019.01); *B32B 27/12* (2013.01);
(Continued)

(58) Field of Classification Search
CPC .. B32B 5/24; B32B 5/024; B32B 7/09; B32B 27/12; B32B 2260/023; B32B 2260/046;
(Continued)

(56) References Cited

U.S. PATENT DOCUMENTS

| 7,267,870 B2 | 9/2007 | Matsumoto et al. |
| 8,092,906 B2 | 1/2012 | Tachibana et al. |

(Continued)

FOREIGN PATENT DOCUMENTS

| CN | 1210913 A | 3/1999 |
| CN | 102575084 A | 7/2012 |

(Continued)

OTHER PUBLICATIONS

Extended European Search Report dated Jul. 22, 2021, from the European Patent office in European patent application No. 18871989.2.

(Continued)

*Primary Examiner* — Catherine A. Simone
(74) *Attorney, Agent, or Firm* — Sughrue Mion, PLLC

(57) ABSTRACT

Provided is a laminate that is excellent in flexibility and has a high bending strength. Also provided is a reinforcing sheet including such laminate. The laminate of the present invention is a laminate including an adhesive layer and a constraining layer, wherein the constraining layer includes an impregnated layer obtained by impregnating a multilayer base material, which is obtained by laminating a plurality of reinforcing fiber sheet-shaped products in each of which reinforcing fiber yarns are arranged in parallel and knitting the products with a stitching thread to integrate the products, with a thermosetting resin composition. The reinforcing sheet of the present invention includes the laminate of the present invention.

13 Claims, 1 Drawing Sheet

(51) Int. Cl.
    *B32B 5/02*     (2006.01)
    *B32B 27/12*     (2006.01)
    *C09J 163/00*     (2006.01)

(52) U.S. Cl.
    CPC ....... *C09J 163/00* (2013.01); *B32B 2260/023* (2013.01); *B32B 2260/046* (2013.01); *B32B 2262/02* (2013.01); *B32B 2262/101* (2013.01); *B32B 2262/106* (2013.01); *B32B 2305/076* (2013.01); *B32B 2305/188* (2013.01)

(58) Field of Classification Search
    CPC .......... B32B 2262/02; B32B 2262/101; B32B 2262/106; B32B 2305/076; B32B 2305/188; B32B 5/073
    See application file for complete search history.

(56) References Cited

U.S. PATENT DOCUMENTS

| | | |
|---|---|---|
| 2005/0032447 A1 | 2/2005 | Tachibana et al. |
| 2005/0032448 A1 | 2/2005 | Matsumoto et al. |
| 2010/0196689 A1 | 8/2010 | Fujii et al. |
| 2012/0244351 A1 | 9/2012 | Katagi et al. |
| 2012/0251830 A1 | 10/2012 | Nishiyama et al. |
| 2014/0283972 A1 | 9/2014 | Nishiyama et al. |
| 2018/0009979 A1 | 1/2018 | Nishiyama et al. |
| 2019/0062511 A1 | 2/2019 | Kurokawa et al. |

FOREIGN PATENT DOCUMENTS

| | | |
|---|---|---|
| EP | 0 909 845 A1 | 4/1999 |
| EP | 1 125 728 A1 | 8/2001 |
| EP | 0 909 845 B1 | 1/2010 |
| JP | 2004-114586 A | 4/2004 |
| JP | 2005-053014 A | 3/2005 |
| JP | 2005-054000 A | 3/2005 |
| JP | 2006-281741 A | 10/2006 |
| JP | 2011-148091 A | 8/2011 |
| JP | 2015-078310 A | 4/2015 |
| WO | 2017/179666 A1 | 10/2017 |

OTHER PUBLICATIONS

International Search Report for PCT/JP2018/040057 dated Jan. 15, 2019 (PCT/ISA/210).
First Office Action dated Nov. 10, 2021 issued by the State Intellectual Property Office of People's Republic of China in Chinese Application No. 201880070803.0.
Second Office Action dated Jun. 23, 2022 by The State Intellectual Property Office of People's Republic of China in Chinese Application No. 201880070803.0.
Zou, "Manufacturing of Organic Abrasives", Standards Press of China, p. 146, Sep. 30, 2001 (4 pages total).

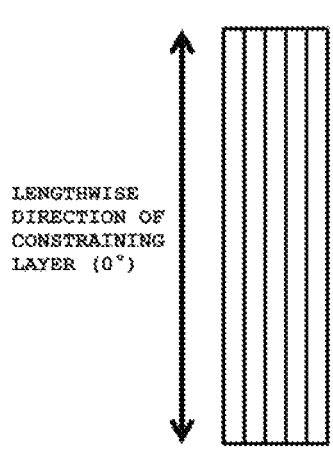 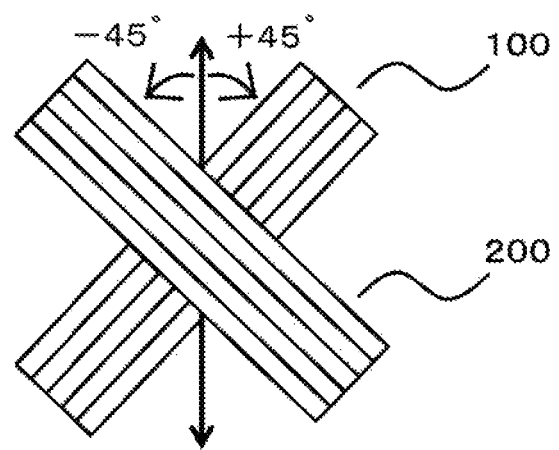

LAMINATE AND REINFORCING SHEET

CROSS REFERENCE TO RELATED APPLICATIONS

This application is a National Stage of International Application No. PCT/JP2018/040057 filed Oct. 29, 2018, claiming priority based on Japanese Patent Application No. 2017-211874 filed Nov. 1, 2017.

TECHNICAL FIELD

The present invention relates to a laminate. The present invention also relates to a reinforcing sheet including the laminate of the present invention. The laminate of the present invention may be used by being bonded to, for example, outer plates and skeletons of various kinds of industrial equipment, such as transportation equipment.

BACKGROUND ART

A steel plate having a small thickness has heretofore been used in the vehicle body of transportation equipment, such as an automobile, for reducing its weight. However, as the thickness of the steel plate is made smaller, the strength of the steel plate reduces. When the transportation equipment, such as an automobile, is reduced in vehicle body strength, there is a problem in that its collision safety and the like deteriorate.

A laminate including a constraining layer containing reinforcing fibers and a resin layer has recently been proposed (Patent Literatures 1 to 3).

However, such related-art laminate as described above involves a problem in that the laminate is poor in flexibility and does not have a sufficient reinforcing property. In addition, the reinforcing property is improved by using a foaming agent in the resin layer to secure its thickness. However, when large bending of the resin layer is caused by collision or the like, there is a problem in that the compression fracture of the resin layer occurs. Because of those reasons, the use applications of such laminate as described above are limited to outer plate panels, and it is difficult to use the laminate for any other purpose, such as the reinforcement of a vehicle body skeleton.

CITATION LIST

Patent Literature

[PTL 1] JP 2005-53014 A
[PTL 2] JP 2005-54000 A
[PTL 3] JP 2011-148091 A

SUMMARY OF INVENTION

Technical Problem

An object of the present invention is to provide a laminate that is excellent in flexibility and has a high bending strength. Another object of the present invention is to provide a reinforcing sheet including such laminate.

Solution to Problem

According to one embodiment of the present invention, there is provided a laminate, including: an adhesive layer; and a constraining layer, wherein the constraining layer includes an impregnated layer obtained by impregnating a multilayer base material, which is obtained by laminating a plurality of reinforcing fiber sheet-shaped products in each of which reinforcing fiber yarns are arranged in parallel and knitting the products with a stitching thread to integrate the products, with a thermosetting resin composition.

In one embodiment, the reinforcing fiber yarns are at least one kind selected from carbon fiber yarns, glass fiber yarns, and resin fiber yarns.

In one embodiment, the plurality of reinforcing fiber sheet-shaped products in the multilayer base material include a reinforcing fiber sheet-shaped product layer (1) and a reinforcing fiber sheet-shaped product layer (2) in which lengthwise directions of the reinforcing fiber yarns are different from lengthwise directions of the reinforcing fiber yarns that the reinforcing fiber sheet-shaped product layer (1) has by 30° or more, and the reinforcing fiber sheet-shaped product layer (1) has a weight equal to or more than a weight of the reinforcing fiber sheet-shaped product layer (2).

In one embodiment, the lengthwise directions of the reinforcing fiber yarns of the reinforcing fiber sheet-shaped product layer (2) form an angle of from 30° to 150° with respect to the lengthwise directions of the reinforcing fiber yarns that the reinforcing fiber sheet-shaped product layer (1) has.

In one embodiment, a weight ratio between the reinforcing fiber sheet-shaped product layer (1) and the reinforcing fiber sheet-shaped product layer (2) is from 9:1 to 5:5.

In one embodiment, the adhesive layer contains an epoxy-based resin.

In one embodiment, the epoxy-based resin contains a rubber-modified epoxy resin.

In one embodiment, the adhesive layer contains a urea-based compound.

In one embodiment, the thermosetting resin composition contains an epoxy-based resin.

In one embodiment, the epoxy-based resin is a combination of a bisphenol A-type epoxy resin and a novolac-type epoxy resin.

In one embodiment, a content ratio between the bisphenol A-type epoxy resin and the novolac-type epoxy resin is from 90:10 to 10:90 in terms of weight ratio.

In one embodiment, the adhesive layer is substantially free of a foaming agent.

In one embodiment, the adhesive layer has a thickness of from 0.4 mm to 3 mm.

In one embodiment, the constraining layer has a thickness of from 0.05 mm to 2 mm.

In one embodiment, the laminate has a total thickness of from 0.4 mm to 5 mm.

In one embodiment, the impregnated layer is a prepreg.

According to one embodiment of the present invention, there is provided a reinforcing sheet, including the laminate according to the one embodiment of the present invention.

Advantageous Effects of Invention

According to the present invention, the laminate that is excellent in flexibility and has a high bending strength can be provided. According to the present invention, the reinforcing sheet including such laminate can also be provided.

BRIEF DESCRIPTION OF DRAWINGS

FIG. 1 is a schematic plan view for illustrating an angle between a reinforcing fiber sheet-shaped product layer (1) and a reinforcing fiber sheet-shaped product layer (2).

DESCRIPTION OF EMBODIMENTS

A laminate of the present invention includes an adhesive layer and a constraining layer. The laminate of the present invention may include any appropriate other layer to the extent that the effects of the present invention are not impaired as long as the laminate includes the adhesive layer and the constraining layer. The laminate of the present invention is preferably formed of the adhesive layer and the constraining layer.

The thickness of the adhesive layer is preferably from 0.4 mm to 3 mm, more preferably from 0.5 mm to 2.5 mm. When the thickness of the adhesive layer is set within the range, the effects of the present invention can be further expressed.

The thickness of the constraining layer is preferably from 0.05 mm to 2 mm, more preferably from 0.1 mm to 1.0 mm. When the thickness of the constraining layer is set within the range, the effects of the present invention can be further expressed.

The total thickness of the laminate of the present invention is preferably from 0.4 mm to 5 mm, more preferably from 0.6 mm to 3.5 mm. When the total thickness of the laminate of the present invention is set within the range, the effects of the present invention can be further expressed.

The laminate of the present invention may be produced by any appropriate method to the extent that the effects of the present invention are not impaired. For example, the laminate maybe produced by bonding the respective layers forming the laminate. Specifically, for example, when the laminate of the present invention is formed of the adhesive layer and the constraining layer, the laminate of the present invention may be produced by preparing the adhesive layer and the constraining layer separately from each other, and bonding the layers to each other.

A reinforcing sheet of the present invention includes the laminate of the present invention. The reinforcing sheet of the present invention may include any appropriate other layer to the extent that the effects of the present invention are not impaired as long as the sheet includes the laminate of the present invention. The reinforcing sheet of the present invention is preferably formed of the laminate of the present invention.

<<Constraining Layer>>

The constraining layer includes an impregnated layer obtained by impregnating a multilayer base material, which is obtained by laminating a plurality of reinforcing fiber sheet-shaped products in each of which reinforcing fiber yarns are arranged in parallel and knitting the products with a stitching thread to integrate the products, with a thermosetting resin composition.

The number of the impregnated layers in the constraining layer may be one, or may be two or more.

The impregnated layer is preferably a prepreg.

The reinforcing fiber sheet-shaped products in each of which the reinforcing fiber yarns are arranged in parallel are each obtained by arranging a plurality of reinforcing fiber yarns in parallel in their lengthwise directions to form a sheet shape.

The multilayer base material is obtained by laminating the plurality of reinforcing fiber sheet-shaped products and knitting the products with the stitching thread to integrate the products.

Any appropriate form may be adopted as the form of the knitting with the stitching thread to the extent that the effects of the present invention are not impaired as long as the form can laminate and integrate the plurality of reinforcing fiber sheet-shaped products. The form of such knitting with the stitching thread is, for example, chain stitching.

When such multilayer base material is adopted, a fiber density in each direction in the constraining layer can be appropriately adjusted, and hence a laminate that can express excellent flexibility in accordance with applications and purposes, and that has a high bending strength can be provided.

Any appropriate reinforcing fiber yarns maybe adopted as the reinforcing fiber yarns to the extent that the effects of the present invention are not impaired. Such reinforcing fiber yarns are, for example, at least one kind selected from carbon fiber yarns, glass fiber yarns, and resin fiber yarns.

The plurality of reinforcing fiber sheet-shaped products in the multilayer base material include a reinforcing fiber sheet-shaped product layer (1) and a reinforcing fiber sheet-shaped product layer (2) in which lengthwise directions of the reinforcing fiber yarns are different from lengthwise directions of the reinforcing fiber yarns that the reinforcing fiber sheet-shaped product layer (1) has by 30° or more. The reinforcing fiber sheet-shaped product layer (1) has a weight equal to or more than a weight of the reinforcing fiber sheet-shaped product layer (2). Of the plurality of reinforcing fiber sheet-shaped products in the multilayer base material, the reinforcing fiber sheet-shaped product layer (2) is a reinforcing fiber sheet-shaped product layer different from the reinforcing fiber sheet-shaped product layer (1), and is a layer in which the lengthwise directions of the reinforcing fiber yarns are different from the lengthwise directions of the reinforcing fiber yarns that the reinforcing fiber sheet-shaped product layer (1) has by 30° or more. When the angle between the reinforcing fiber sheet-shaped product layer (1) and the reinforcing fiber sheet-shaped product layer (2) is adjusted as described above, a laminate that can express excellent flexibility in accordance with applications and purposes, and that has a high bending strength can be provided.

With regard to the angle between the reinforcing fiber sheet-shaped product layer (1) and the reinforcing fiber sheet-shaped product layer (2), an angle in a clockwise direction with respect to the lengthwise direction of the constraining layer) (0°) is defined as a positive angle, and an angle in a counterclockwise direction with respect thereto is defined as a negative angle. For example, as illustrated in FIG. 1, when a reinforcing fiber sheet-shaped product layer (1) 100 is rotated by 45° in the clockwise direction (i.e., +45°) and a reinforcing fiber sheet-shaped product layer (2) 200 is rotated by 45° in the counterclockwise direction (i.e., −45°) from a state in which the reinforcing fiber yarns that the reinforcing fiber sheet-shaped product layer (1) 100 has and the reinforcing fiber yarns that the reinforcing fiber sheet-shaped product layer (2) 200 has, which are in a state in which their lengthwise directions are aligned with each other, are placed in the lengthwise direction of the constraining layer, an angle formed by the reinforcing fiber sheet-shaped product layer (1) 100 and the reinforcing fiber sheet-shaped product layer (2) 200 is 90°.

The angle of the lengthwise directions of the reinforcing fiber yarns of the reinforcing fiber sheet-shaped product layer (2) with respect to the lengthwise directions of the reinforcing fiber yarns that the reinforcing fiber sheet-shaped product layer (1) has is preferably from 30° to 150°, more preferably from 45° to 135°. When the angle of the lengthwise directions of the reinforcing fiber yarns of the reinforcing fiber sheet-shaped product layer (2) with respect to the lengthwise directions of the reinforcing fiber yarns that the reinforcing fiber sheet-shaped product layer (1) has falls within the range, a laminate that can express more excellent flexibility in accordance with applications and purposes, and that has a higher bending strength can be provided.

A weight ratio between the reinforcing fiber sheet-shaped product layer (1) and the reinforcing fiber sheet-shaped product layer (2) is preferably from 9:1 to 5:5, more preferably from 8:1 to 5:5, still more preferably from 7:1 to 5:5, particularly preferably from 6:1 to 5:5. When the weight ratio between the reinforcing fiber sheet-shaped product layer (1) and the reinforcing fiber sheet-shaped product layer (2) is adjusted as described above, a laminate that can express more excellent flexibility in accordance with applications and purposes, and that has a higher bending strength can be provided.

As the thermosetting resin composition, any appropriate thermosetting resin composition may be adopted to the extent that the effects of the present invention are not impaired. Examples of such thermosetting resin composition include an epoxy-based resin, a phenol-based resin, a polyimide-based resin, and a benzoxazine-based resin. Of those, the thermosetting resin composition preferably contains an epoxy-based resin. When the thermosetting resin composition contains the epoxy-based resin, a laminate that can express more excellent flexibility in accordance with applications and purposes, and that has a higher bending strength can be provided.

The epoxy-based resins may be used alone or in combination thereof.

As the epoxy-based resin, any appropriate epoxy-based resin maybe adopted to the extent that the effects of the present invention are not impaired. Examples of such epoxy-based resin include: glycidyl ether obtained from polyol; glycidylamine obtained from an amine having a plurality of active hydrogen atoms; glycidyl ester obtained from a polycarboxylic acid; and polyepoxide obtained by oxidizing a compound having a plurality of double bonds in a molecule thereof. Specific examples thereof include: bisphenol-type epoxy resins, such as a bisphenol A-type epoxy resin, a bisphenol F-type epoxy resin, a bisphenol S-type epoxy resin, and a tetrabromobisphenol A-type epoxy resin; novolac-type epoxy resins, such as a phenol novolac-type epoxy resin and a cresol novolac-type epoxy resin; glycidylamine-type epoxy resins, such as tetraglycidyl diaminodiphenylmethane, triglycidyl aminophenol, and tetraglycidyl xylenediamine; dicyclopentadiene-type epoxy resins; and naphthalene-type epoxy resins. Of those, combinations of the following resins are preferred: bisphenol A-type epoxy resins; novolac-type epoxy resins each serving as a highly heat-resistant epoxy resin, such as a phenol novolac-type epoxy resin and a cresol novolac-type epoxy resin; glycidylamine-type epoxy resins, such as tetraglycidyl diaminodiphenylmethane, triglycidyl aminophenol, and tetraglycidyl xylenediamine; dicyclopentadiene-type epoxy resins; and naphthalene-type epoxy resins. Of those, such a combination that a content ratio between a bisphenol A-type epoxy resin and a highly heat-resistant epoxy resin (preferably a novolac-type epoxy resin) is preferably from 90:10 to 10:90, more preferably from 80:20 to 20:80, still more preferably from 70:30 to 50:50 in terms of weight ratio is preferred.

The content of the epoxy-based resin in the thermosetting resin composition is preferably from 50 weight % to 99 weight %, more preferably from 70 weight % to 98 weight %, still more preferably from 80 weight % to 97 weight %, particularly preferably from 90 weight % to 96 weight %. When the content of the epoxy-based resin in the thermosetting resin composition falls within the range, a laminate that can express more excellent flexibility in accordance with applications and purposes, and that has a higher bending strength can be provided.

To provide a laminate that can express excellent flexibility, an epoxy resin that is solid at normal temperature and an epoxy resin that is liquid at normal temperature are preferably combined with each other. A content ratio between the epoxy resin that is solid at normal temperature and the epoxy resin that is liquid at normal temperature is preferably from 90:10 to 10:90, more preferably from 80:20 to 20:80, still more preferably from 70:30 to 50:50 in terms of weight ratio.

The thermosetting resin composition may contain a curing agent. An example of such curing agent is a compound having an active group capable of reacting with an epoxy group. Examples of such curing agent include amine-based curing agents, for example: aliphatic amines, such as ethylenediamine, diethylenetriamine, triethylenetetramine, hexamethylenediamine, and m-xylylenediamine; aromatic amines, such as m-phenylenediamine, diaminodiphenylmethane, diaminodiethyldiphenylmethane, and diaminodiethyldiphenylsulfone; tertiary amines, such as benzyldimethylamine, tetramethylguanidine, and 2,4,6-tris(dimethylaminomethyl)phenol; basic active hydrogen compounds, such as dicyandiamide; organic acid dihydrazides, such as adipic acid dihydrazide; and imidazoles, such as 2-methylimidazole and 2-ethyl-4-methylimidazole. Examples thereof also include acid anhydride-based curing agents, for example: aliphatic acid anhydrides, such as polyadipic anhydride, poly(ethyloctadecanedioic)anhydride, and polysebacic anhydride; alicyclic acid anhydrides, such as methyltetrahydrophthalic anhydride, hexahydrophthalic anhydride, and methylcyclohexene dicarboxylic anhydride; aromatic acid anhydrides, such as phthalic anhydride, trimellitic anhydride, pyromellitic anhydride, and glycerol tristrimellitate; and halogen-based acid anhydrides, such as het anhydride and tetrabromophthalic anhydride. In the present invention, an amine-based curing agent is preferred, and a basic active hydrogen compound is more preferred as the curing agent because the composition cures at relatively low temperature and has satisfactory storage stability.

The curing agents may be used alone or in combination thereof.

The content of the curing agent in the thermosetting resin composition is preferably from 0.1 weight % to 10 weight %, more preferably from 1 weight % to 9 weight %, still more preferably from 2 weight % to 8 weight %, particularly preferably from 3 weight % to 7 weight % with respect to 100 weight % of the epoxy-based resin. When the content of the curing agent in the thermosetting resin composition falls within the range, a laminate that can express more excellent flexibility in accordance with applications and purposes, and that has a higher bending strength can be provided.

The thermosetting resin composition may contain a curing accelerator. Examples of such curing accelerator include: an example in which an amine-based curing agent, such as dicyandiamide, which is a curing agent is combined with a urea derivative or an imidazole derivative serving as a curing accelerator; and an example in which a carboxylic acid anhydride or a polyphenol compound that is a curing agent is combined with a tertiary amine or an imidazole derivative serving as a curing accelerator. In the present invention, an amine-based curing agent (preferably a basic active hydrogen compound, more preferably dicyandiamide) serving as a curing agent is preferably used in combination with a urea-based curing accelerator formed of a urea derivative serving as a curing accelerator because the composition cures at relatively low temperature and has satisfactory storage stability. Examples of such urea-based curing accelerator include 4,4'-methylenebis(phenyldimethylurea), 3-phenyl-1,1-dimethylurea, 3-(3,4-dichlorophenyl)-1,1-dimethylurea (DCMU), and 1,1'-4(methyl-m-phenylene)bis(3,3'-dimethylurea).

The curing accelerators may be used alone or in combination thereof.

The content of the curing accelerator in the thermosetting resin composition is preferably from 0.1 weight % to 10 weight %, more preferably from 0.5 weight % to 8 weight %, still more preferably from 1 weight % to 6 weight %, particularly preferably from 1.5 weight % to 5 weight % with respect to 100 parts by weight of the epoxy-based resin. When the content of the curing accelerator in the thermosetting resin composition falls within the range, a laminate that can express more excellent flexibility in accordance with applications and purposes, and that has a higher bending strength can be provided.

The thermosetting resin composition may contain any appropriate other component to the extent that the effects of the present invention are not impaired. Examples of such other component include a polymer compound, an organic filler, an inorganic filler, and a coupling agent.

The other components may be used alone or in combination thereof.

As the polymer compound, there is given, for example, a thermoplastic resin. An example of such thermoplastic resin is a thermoplastic resin having, in a main chain thereof, a bond selected from a carbon-carbon bond, an amide bond, an imide bond, an ester bond, an ether bond, a carbonate bond, a urethane bond, a urea bond, a thioether bond, a sulfone bond, an imidazole bond, and a carbonyl bond. Specific examples of such thermoplastic resin include engineering plastics, such as polyacrylate, polyamide, polyaramid, polyester, polycarbonate, polyphenylene sulfide, polybenzimidazole, polyimide, polyetherimide, polyurethane, polysulfone, polyethersulfone, polyvinyl acetal, and polyvinyl formal. Of those, a polyvinyl compound, such as polyvinyl acetal or polyvinyl formal, is preferred because of the following reasons: the compound can be easily dissolved in an epoxy resin by heating to improve the adhesive property of a cured product of the thermosetting resin composition with the reinforcing fiber yarns without impairing the heat resistance of the cured product; and the viscosity of the solution thus obtained can be adjusted.

Examples of the organic filler include rubber particles, melamine resin particles, phenol resin particles, silicone resin particles, polyimide particles, polyamide particles, polyethersulfone particles, polyurethane particles, and polyacrylate particles. The rubber particles have an effect by which the toughness of the cured product obtained by curing the thermosetting resin composition can be improved, and the impact resistance of the cured product can be improved. Examples of such rubber particles include: cross-linked rubber particles; and core-shell rubber particles obtained by subjecting the surfaces of the cross-linked rubber particles to graft polymerization with a dissimilar polymer.

Examples of the inorganic filler include calcium carbonate (e.g., heavy calcium carbonate, light calcium carbonate, and Hakurenka), talc, mica, clay, mica powder, bentonite, smectite, silica (e.g., hydrophobic silica), alumina, aluminum silicate, aluminum hydroxide, titanium oxide, barium titanate, ferrite, carbon black, acetylene black, aluminum powder, glass powder, and glass balloons.

Examples of the coupling agent include: vinyl group-containing silane coupling agents, such as vinyltriethoxysilane, vinyltripropoxysilane, vinyltriisopropoxysilane, and vinyltributoxysilane; epoxy group-containing silane coupling agents, such as γ-glycidoxypropyltrimethoxysilane, γ-glycidoxypropyltriethoxysilane, 3-glycidoxypropylmethyldiethoxysilane, and 2-(3,4-epoxycyclohexyl)ethyltrimethoxysilane; amino group-containing silane coupling agents, such as γ-aminopropyltrimethoxysilane, N-β-(aminoethyl)-γ-aminopropylmethyldimethoxysilane, N-(2-aminoethyl)3-aminopropylmethyldimethoxysilane, γ-triethoxysilyl-N-(1,3-dimethylbutylidene)propylamine, and N-phenyl-γ-aminopropyltrimethoxysilane; mercapto group-containing silane coupling agents, such as γ-mercaptopropylmethyldimethoxysilane; styryl group-containing silane coupling agents, such as p-styryltrimethoxysilane; (meth) acryl group-containing silane coupling agents, such as γ-acryloxypropyltrimethoxysilane and γ-methacryloxypropyltriethoxysilane; isocyanate group-containing silane coupling agents, such as 3-isocyanatopropyltriethoxysilane; and polysulfide group-containing silane coupling agents, such as bis(triethoxysilylpropyl)tetrasulfide.

The content of a resin component in the prepreg is preferably from 10 weight % to 60 weight %, more preferably from 20 weight % to 50 weight %, still more preferably from 25 weight % to 45 weight %, particularly preferably from 30 weight % to 40 weight %. When the content of the resin component in the prepreg is set within the range, a laminate that can express more excellent flexibility in accordance with applications and purposes, and that has a higher bending strength can be provided.

A method of producing the prepreg may be, for example, a wet method including dissolving a matrix resin in a solvent, such as methyl ethyl ketone or methanol, reducing the viscosity of the solution thus obtained, and impregnating reinforcing fibers with the solution, or a hot melt method including impregnating the reinforcing fibers with the thermosetting resin composition reduced in viscosity through heating as required. In the hot melt method, the prepreg is obtained by impregnating the reinforcing fibers with the thermosetting resin composition reduced in viscosity through heating as required, or by coating the top of release paper or the like with the thermosetting resin composition reduced in viscosity through heating as required to produce a resin sheet, then folding the resin sheet from both sides or one side of the reinforcing fibers, and heating and pressurizing the sheet to impregnate the reinforcing fibers with the thermosetting resin composition. The hot melt method is preferred because no solvent remains in the prepreg.

The prepreg is, for example, a unidirectional material (UD material) prepreg in which continuous fibers serving as the reinforcing fibers are paralleled in one direction, a woven fabric prepreg, a knitted fabric prepreg, or a nonwoven fabric prepreg. Of those, the UD material prepreg is often used in a structural material for an aircraft, a ship, a windmill, or the like because the prepreg has a high strength and a high modulus of elasticity along the directions of the fibers. Meanwhile, the woven fabric prepreg has an excellent property by which a shape having a complex curved surface is imparted and an excellent design property. In addition, the woven fabric prepreg alone expresses some degree of strength not only in longitudinal and lateral directions but also in an intermediate direction. Accordingly, the woven fabric prepreg has been widely applied. The weave of the woven fabric prepreg is, for example, a plain weave or a satin weave. A typical woven fabric has a weave in which reinforcing fiber yarns are arranged in two directions, that is, longitudinal and lateral directions, and hence bending (crimps) occurs in the reinforcing fiber yarns at points of intersection of warps and wefts. The straightness of each of the reinforcing fiber yarns is reduced by the crimps. Accordingly, in general, in the case where the woven fabric prepreg is used, mechanical characteristics tend to be inferior to those in the case where the UD material prepreg is used. The use of a non-crimp fabric (NCF) that is a multilayer base material obtained as follows has been attracting attention as one method of solving such problem: a plurality of layers of reinforcing fiber yarns in each of which the yarns are arranged in parallel in one direction are laminated at angles different from each other, and the layers in the state are knitted with a stitching thread to be integrated. The NCF can reduce the number of the crimps of the reinforcing fiber yarns to improve the mechanical characteristics of a fiber-reinforced composite material to be obtained. In addition, a fiber-reinforced composite material having a laminated structure, such as a pseudo-isotropic structure, can be produced with one sheet of the NCF. Accordingly, the NCF can simplify a prepreg-laminating operation as compared to a UD material and a woven fabric base material, and hence has been expected as a base material that can achieve a reduction in cost of the fiber-reinforced composite material. In particular, the NCF can produce a base material having a large weight per unit area as compared to the UD material and the woven fabric base material, and hence can produce a prepreg having a large weight per unit area and a controlled lamination direction when combined with the wet method.

Any appropriate forming method may be adopted as a method of forming the prepreg to the extent that the effects of the present invention are not impaired. Examples of such forming method include: a method including forming the prepreg into a cylindrical body through sheet winding, fastening the overlapping portions of its surface with a wrapping tape or the like, and then curing the resultant in a heating furnace; a method including laminating the reinforcing fiber yarn layers at predetermined alignment angles and curing the resultant in an autoclave or a heating furnace while removing voids with a vacuum bag or the like; and a method including forming the prepreg through high-cycle press forming in a mold.

<<Adhesive Layer>>

The adhesive layer preferably contains an epoxy-based resin.

The adhesive layer is preferably formed from an adhesive composition containing the epoxy-based resin.

The epoxy-based resins may be used alone or in combination thereof.

The content of the epoxy-based resin in the adhesive composition is preferably from 5 weight % to 80 weight %, more preferably from 10 weight % to 70 weight %, still more preferably from 15 weight % to 60 weight %, particularly preferably from 20 weight % to 50 weight %. When the content of the epoxy-based resin in the adhesive composition falls within the range, a laminate that can express more excellent flexibility in accordance with applications and purposes, and that has a higher bending strength can be provided.

As the epoxy-based resin, any appropriate epoxy-based resin maybe adopted to the extent that the effects of the present invention are not impaired. Examples of such epoxy-based resin include: bisphenol-type epoxy resins, such as a bisphenol A-type epoxy resin, a bisphenol F-type epoxy resin, a bisphenol S-type epoxy resin, and a hydrogenated bisphenol A-type epoxy resin; novolac-type epoxy resins, such as a phenol novolac-type epoxy resin and a cresol novolac-type epoxy resin; aromatic epoxy resins, such as a biphenyl-type epoxy resin and a naphthalene-type epoxy resin; nitrogen-containing cyclic epoxy resins, such as triglycidyl isocyanurate and a hydantoin epoxy resin; aliphatic epoxy resins; alicyclic epoxy resins, such as a dicyclo ring-type epoxy resin; glycidyl ether-type epoxy resins; urethane-modified epoxy resins; and rubber-modified epoxy resins.

The epoxy-based resin preferably contains a bisphenol A-type epoxy resin that is liquid at normal temperature because the effects of the present invention can be further expressed. When the adhesive composition contains the bisphenol A-type epoxy resin that is liquid at normal temperature as the epoxy-based resin, a laminate that can express more excellent flexibility in accordance with applications and purposes, and that has a higher bending strength can be provided.

When the epoxy-based resin contains the bisphenol A-type epoxy resin that is liquid at normal temperature, the content of the bisphenol A-type epoxy resin that is liquid at normal temperature in the adhesive composition is preferably from 10 weight % to 90 weight %, more preferably from 15 weight % to 80 weight %, still more preferably from 20 weight % to 70 weight %, particularly preferably from 25 weight % to 60 weight %. When the content of the bisphenol A-type epoxy resin that is liquid at normal temperature in the adhesive composition falls within the range, a laminate that can express more excellent flexibility in accordance with applications and purposes, and that has a higher bending strength can be provided.

The epoxy-based resin preferably contains a rubber-modified epoxy resin because the effects of the present invention can be further expressed. When the adhesive composition contains the rubber-modified epoxy resin as the epoxy-based resin, a laminate that can express more excellent flexibility in accordance with applications and purposes, and that has a higher bending strength can be provided.

The rubber-modified epoxy resins may be used alone or in combination thereof.

The rubber-modified epoxy resin is an epoxy resin containing a rubber component and is prepared by the reaction (modification) of the epoxy resin with the rubber component.

The rubber component is a rubber having a terminal group that reacts with an epoxy resin, and examples thereof include a terminal carboxyl-modified butadiene-acrylonitrile copolymer (CTBN), a butadiene-based rubber, an acrylic rubber, and a styrene-butadiene-based elastomer.

Such rubber components may be used alone or in combination thereof.

As such rubber component, there is preferably given, for example, a terminal carboxyl-modified butadiene-acrylonitrile copolymer (CTBN).

To prepare the rubber-modified epoxy resin, for example, the epoxy-based resin and the rubber component are mixed with each other, and a catalyst is added to the mixture as required, followed by the reaction (modification) of the mixture at, for example, from 100° C. to 180° C. Thus, the terminal group of the rubber component and the epoxy-based resin react with each other to prepare the rubber-modified epoxy resin.

The rubber-modified epoxy resin preferably contains a liquid rubber-modified epoxy resin and a solid rubber-modified epoxy resin. When the rubber-modified epoxy resin contains the liquid rubber-modified epoxy resin and the solid rubber-modified epoxy resin, a laminate that can express more excellent flexibility in accordance with applications and purposes, and that has a higher bending strength can be provided.

The liquid rubber-modified epoxy resin is a rubber-modified epoxy resin that is liquid at normal temperature, and is preferably, for example, a liquid CTBN-modified epoxy resin.

The epoxy equivalent of the liquid rubber-modified epoxy resin is, for example, preferably from 100 g/eq to 1,000 g/eq, more preferably from 200 g/eq to 600 g/eq.

The solid rubber-modified epoxy resin is a rubber-modified epoxy resin that is solid at normal temperature, and is preferably, for example, a solid CTBN-modified epoxy resin.

The epoxy equivalent of the solid rubber-modified epoxy resin is, for example, preferably from 500 g/eq to 2,500 g/eq, more preferably from 1,000 g/eq to 2,000 g/eq.

When the rubber-modified epoxy resin contains the liquid rubber-modified epoxy resin and the solid rubber-modified epoxy resin, a compounding ratio (weight ratio) between the liquid rubber-modified epoxy resin and the solid rubber-modified epoxy resin is, for example, preferably from 95:5 to 35:65, more preferably from 90:10 to 40:60, still more preferably from 85:15 to 45:55.

A commercial product may be used as the rubber-modified epoxy resin. Examples of such commercial product include: a product available under the product name "EPR-1415-1" (liquid CTBN-modified epoxy resin, epoxy equivalent: 400 g/eq, manufactured by Adeka Corporation); a product available under the product name "EPR-2000" (liquid CTBN-modified epoxy resin, epoxy equivalent: 215 g/eq, manufactured by Adeka Corporation); and a product available under the product name "HYypoxRK84L" (solid CTBN-modified epoxy resin, epoxy equivalent: from 1,200 g/eq to 1,800 g/eq, manufactured by CVC Specialty Chemicals, Inc.).

The content of the rubber-modified epoxy resin in the adhesive composition is preferably from 10 weight % to 95 weight %, more preferably from 20 weight % to 90 weight %, still more preferably from 30 weight % to 80 weight %, particularly preferably from 40 weight % to 70 weight %. When the content of the rubber-modified epoxy resin in the adhesive composition falls within the range, a laminate that can express more excellent flexibility in accordance with applications and purposes, and that has a higher bending strength can be provided.

The adhesive composition may contain a latent curing agent. The latent curing agent is a curing agent that is solid at normal temperature and becomes liquid at a predetermined temperature to cure the epoxy resin, and is preferably a compound having activity in the temperature range of from 80° C. to 200° C.

Such latent curing agents may be used alone or in combination thereof.

Examples of the latent curing agent include a urea-based compound, an amine-based compound, an acid anhydride-based compound, an amide-based compound, a dihydrazide-based compound, an imidazole-based compound, and an imidazoline-based compound. Of those, a urea-based compound and an amide compound are preferably used in combination as the latent curing agent.

Examples of the urea-based compound include 3-(3,4-dichlorophenyl)-1,1-dimethylurea (DCMU), N'-phenyl-N,N-dimethylurea, and 1,1'-(methyl-m-phenylene)bis(3,3'-dimethylurea). Of those urea-based compounds, 3-(3,4-dichlorophenyl)-1,1-dimethylurea (DCMU) is preferred because the effects of the present invention can be further expressed.

Examples of the amine-based compound include ethylenediamine, propylenediamine, diethylenetriamine, triethylenetetramine, amine adducts thereof, m-phenylenediamine, diaminodiphenylmethane, and diaminodiphenylsulfone.

Examples of the acid anhydride-based compound include phthalic anhydride, maleic anhydride, tetrahydrophthalic anhydride, dodecenyl succinic anhydride, dichlorosuccinic anhydride, benzophenone tetracarboxylic anhydride, and chlorendic anhydride.

Examples of the amide-based compound include dicyandiamide and polyamide. Of those amide compounds, dicyandiamide is preferred because the effects of the present invention can be further expressed.

Examples of the hydrazide-based compound include dihydrazides, such as adipic acid dihydrazide.

Examples of the imidazole-based compound include methylimidazole, 2-ethyl-4-methylimidazole, ethylimidazole, isopropylimidazole, 2,4-dimethylimidazole, phenylimidazole, undecylimidazole, heptadecylimidazole, and 2-phenyl-4-methylimidazole.

Examples of the imidazoline-based compound include methylimidazoline, 2-ethyl-4-methylimidazoline, ethylimidazoline, isopropylimidazoline, 2,4-dimethylimidazoline, phenylimidazoline, undecylimidazoline, heptadecylimidazoline, and 2-phenyl-4-methylimidazoline.

The content of the latent curing agent in the adhesive composition is preferably from 1 part by weight to 30 parts by weight, more preferably from 2 parts by weight to 20 parts by weight, still more preferably from 3 parts by weight to 15 parts by weight, particularly preferably from 5 parts by weight to 10 parts by weight with respect to 100 parts by weight of the epoxy-based resin. When the content of the latent curing agent in the adhesive composition falls within the range, a laminate that can express more excellent flexibility in accordance with applications and purposes, and that has a higher bending strength can be provided.

The adhesive composition may contain a filler or a toughness-imparting agent.

The fillers may be used alone or in combination thereof. The toughness-imparting agents may be used alone or in combination thereof.

When the adhesive composition contains the filler, a laminate that can express more excellent flexibility in accordance with applications and purposes, and that has a higher bending strength can be provided.

Examples of the filler include a hard filler and a soft filler.

Examples of the hard filler include calcium carbonate (e.g., heavy calcium carbonate, light calcium carbonate, and Hakurenka), talc, mica, clay, mica powder, bentonite, silica (e.g., hydrophobic silica), alumina, aluminum silicate, aluminum hydroxide, titanium oxide, barium titanate, ferrite, carbon black, acetylene black, aluminum powder, glass powder, and glass balloons.

Preferred examples of the hard filler include hydrophobic silica and glass powder because the effects of the present invention can be further expressed, and for example, the hydrophobic silica and the glass powder are more preferably used in combination.

When the hydrophobic silica and the glass powder are used in combination, the compounding ratio of the hydrophobic silica is preferably from 1 part by weight to 20 parts by weight with respect to 100 parts by weight of the glass powder.

Examples of the soft filler include a rubber, an elastomer, and a thermoplastic resin, such as nylon (trademark).

The soft filler is preferably, for example, a rubber because the effects of the present invention can be further expressed, and the filler is more preferably, for example, core-shell-type acrylic polymer rubber particles. The core-shell-type acrylic polymer rubber particles are core/shell-type particles each including: a core portion that is substantially formed of a rubber; and a shell portion that is formed of an acrylic polymer and includes the core portion.

When the hard filler and the soft filler are used in combination, the compounding ratio of the hard filler is preferably from 1 part by weight to 500 parts by weight with respect to 100 parts by weight of the soft filler because the effects of the present invention can be further expressed, and the ratio is more preferably from 2 parts by weight to 100 parts by weight, still more preferably from 5 parts by weight to 20 parts by weight.

The content of the filler in the adhesive composition is preferably from 2 parts by weight to 500 parts by weight with respect to 100 parts by weight of the epoxy-based resin because the effects of the present invention can be further expressed, and the content is more preferably from 5 parts by weight to 300 parts by weight, still more preferably from 10 parts by weight to 100 parts by weight, particularly preferably from 15 parts by weight to 50 parts by weight.

Examples of the toughness-imparting agent include urethane polymers (urethane resins).

Of such urethane polymers, for example, a urethane acrylate resin is preferred, and a urethane resin having an acryloyl group at a terminal thereof is more preferred.

The compounding ratio of the toughness-imparting agent in the adhesive composition is preferably from 1 part by weight to 100 parts by weight with respect to 100 parts by weight of the epoxy-based resin because the effects of the present invention can be further expressed, and the compounding ratio is more preferably from 5 parts by weight to 50 parts by weight.

The adhesive composition may contain, for example, a known additive, such as a tackifier (e.g., a rosin-based resin, a terpene-based resin, a coumarone-indene-based resin, or a petroleum-based resin), a lubricant (e.g., stearic acid), a stabilizing agent, an age resistor, an antioxidant, a UV absorbing agent, a colorant, a flame retardant, an antistatic agent, a conductivity-imparting agent, a sliding property-imparting agent, or a surfactant, at an appropriate ratio as required.

The adhesive composition is prepared as a kneaded product by kneading the respective components forming the composition with, for example, a mixing roll. In addition, at the time of the kneading, heating may be performed as required.

The resultant kneaded product may be sandwiched between, for example, two sheets of release paper and rolled by, for example, press forming to form the adhesive layer between the two sheets of release paper.

In addition, a double-sided pressure-sensitive adhesive tape may be obtained by: applying the resultant kneaded product to both surfaces of a base material under such a temperature condition that the latent curing agent is substantially free from undergoing a reaction through, for example, knife coating, roll coating, or extrusion coating to form the adhesive layers; and then bonding release paper to each of the surfaces of the adhesive layers formed on both surfaces of the base material.

In addition, a double-sided pressure-sensitive adhesive tape may be obtained by, for example, applying the adhesive composition to laminate the adhesive layer on a release paper surface or the like, and then laminating the resultant on each of both surfaces of a base material.

Any such double-sided pressure-sensitive adhesive tape can join, for example, the structural members of various industrial products as follows: the release paper on one surface of the tape is peeled, and the remainder is bonded to the surface of an adherend; and then the release paper on the surface opposite to the bonding surface is peeled, and the remainder is bonded to any such structural member. Examples of the adherend include: a metal adherend, such as a metal panel; and a resin adherend, such as a resin panel.

It is preferred that the adhesive layer be substantially free of a foaming agent. That is, it is preferred that the adhesive composition be substantially free of a foaming agent. The phrase "substantially free of a foaming agent" means that the foaming agent is not incorporated in such an amount as to exhibit an action and an effect as a foaming agent (i.e., means that the incorporation of such a trace amount of the foaming agent that the foaming agent does not exhibit any action or effect as a foaming agent is not excluded), and it is preferred that the content of the foaming agent in the adhesive layer be 0 weight % in terms of weight ratio, that is, the content thereof in the adhesive composition be 0 weight % in terms of weight ratio. Even when the adhesive layer in the laminate of the present invention is substantially free of a foaming agent, a laminate that can express more excellent flexibility in accordance with applications and purposes, and that has a higher bending strength can be provided.

EXAMPLES

<Bending Strength>

The release paper of a laminate obtained in each of Examples and Comparative Example was peeled, and the remainder was bonded to an oil-surface cold-pressed steel plate measuring 25 mm wide by 150 mm long by 0.8 mm thick (SPCC-SD, manufactured by Nippon Testpanel Co., Ltd.) at 20° C. The resultant was subjected to heat pressing at 170° C. and 0.1 MPa for 30 minutes to produce a test piece.

The test piece was supported at a span of 100 mm under a state in which its steel plate faced upward, and a test bar was caused to fall from an upward position in a vertical direction at a compression speed of 5 mm/min toward the center in its lengthwise direction, followed by the measurement of the maximum bending strength of the test piece at the time and the displacement thereof at the time of the maximum bending strength.

Production Example 1

Respective components were compounded in accordance with compounding formulation shown in Table 1, and were kneaded with a mixing roll to prepare a kneaded product (adhesive composition). In the kneading, the kneaded product was obtained by: kneading an epoxy resin, a rubber-modified epoxy resin, a filler, and a toughness-imparting agent with the mixing roll heated to 120° C. first; then cooling the kneaded product to from 60° C. to 100° C.; further adding a latent curing agent to the cooled product; and kneading the mixture with the mixing roll.

Next, the resultant kneaded product was rolled into a thickness of 0.2 mm by press forming under a state of being sandwiched between two sheets of release paper. Thus, an adhesive layer was formed.

After that, the release paper on one surface of the adhesive layer was peeled, and the adhesive layer was bonded to each of both surfaces of a nonwoven fabric base material having a thickness of 250 μm (weight: 38 g/m$^2$) by heat pressing (50° C.) so that the total thickness of the adhesive layers and the base material became 0.5 mm. Thus, a double-sided adhesive tape (1) was produced.

TABLE 1

| | Brand | Compounding amount (part(s) by weight) |
|---|---|---|
| Liquid bisphenol A-type epoxy resin | Product name: EPICOAT (trademark) #834 Epoxy equivalent: 270 g/eq Manufactured by Mitsubishi Chemical Corporation | 60 |
| Liquid rubber-modified epoxy resin | Product name: EPR2000 Liquid CTBN-modified epoxy resin Epoxy equivalent: 215 g/eq Manufactured by Adeka Corporation | 20 |
| Solid rubber-modified epoxy resin | Product name: HYypoxRK84L Solid CTBN-modified epoxy resin Epoxy equivalent: 1,200 g/eq to 1,800 g/eq Manufactured by CVC Specialty Chemicals, Inc. | 20 |
| Urea-based compound | Product name: DCMU 3-(3,4-Dichlorophenyl)-1,1-dimethylurea Manufactured by Hodogaya Chemical Co., Ltd. | 2 |
| Dicyandiamide | Product name: DDA-50 Manufactured by CVC Specialty Chemicals, Inc. | 5 |
| Hydrophobic silica | Product name: AEROSIL RY200 Manufactured by Nippon Aerosil Co., Ltd. | 3 |
| Glass powder | Product name: PF70E-001 Manufactured by Nitto Boseki Co., Ltd. | 20 |
| Coupling agent | Product name: KBM403 Manufactured by Shin-Etsu Chemical Co., Ltd. | 0.5 |

Example 1

(Preparation of Constraining Layer)

60 Parts by weight of a phenol novolac-type epoxy resin (EP-154, manufactured by Mitsubishi Chemical Corporation), 40 parts by weight of a bisphenol A-type epoxy resin (GRADE 1001, manufactured by Mitsubishi Chemical Corporation), 5 parts by weight of a curing agent (dicyandiamide, OMICURE 5, manufactured by CVC Specialty Chemicals, Inc.), and 2 parts by weight of a curing accelerator (4,4'-methylenebis(phenyldimethylurea), OMICURE 52, manufactured by CVC Specialty Chemicals, Inc.) were dispersed and dissolved in methyl ethyl ketone to prepare an impregnation solution (1).

Separately, "TORAYCA" (trademark) manufactured by Toray Industries, Inc. (T700SC-12000, reinforcing fiber density: 1.8 g/cm$^3$) was used as reinforcing fibers, and a predetermined number of the fibers were arranged in a direction of +45° or −45° to form a layer so that the layer had a weight of 100 g/m$^2$. The layers were stitched with a polyester thread by chain stitching to produce a carbon fiber base material (1) having a weight of 200 g/m$^2$.

The carbon fiber base material (1) was impregnated with the impregnation solution (1), and the solvent was volatilized with a dryer. Thus, a prepreg (1) having a resin component content of 35 weight % was produced.

The five prepregs (1) thus obtained were laminated, and were pressed at 80° C. and 0.2 MPa for 30 seconds to provide a constraining layer (1).

(Production of Laminate)

One sheet of release paper of the double-sided adhesive tape (1) obtained in Production Example 1 was peeled, and the remainder was bonded to the constraining layer (1). Thus, a laminate (1) was obtained.

The constraining layer (1) had a thickness of 1,200 μm, the adhesive layers had a total thickness of 500 μm, and the laminate (1) had a thickness of 1,700 μm. A bending strength evaluation was performed by setting the direction of +45° in the 150-millimeter length direction.

The results are shown in Table 2.

Example 2

(Preparation of Constraining Layer)

The same impregnation solution (1) as that of Example 1 was prepared as an impregnation solution.

Separately, E glass fibers (tensile strength: 3,500 MPa, tensile modulus of elasticity: 74 GPa, reinforcing fiber density: 2.6 g/cm$^2$, single fiber diameter: 12 μm) were used as reinforcing fibers, and a predetermined number of the fibers were arranged in a direction of +45° or −45° to form a layer so that the layer had a weight of 220 g/m$^2$. The layers were stitched with a polyester thread by chain stitching to produce a glass fiber base material (2) having a weight of 440 g/m$^2$.

The glass fiber base material (2) was impregnated with the impregnation solution (1), and the solvent was volatilized with a dryer. Thus, a prepreg (2) having a resin component content of 35 weight % was produced.

The two prepregs (2) thus obtained were laminated, and were pressed at 80° C. and 0.2 MPa for 30 seconds to provide a constraining layer (2).

(Production of Laminate)

One sheet of release paper of the double-sided adhesive tape (1) obtained in Production Example 1 was peeled, and the remainder was bonded to the constraining layer (2). Thus, a laminate (2) was obtained.

The constraining layer (2) had a thickness of 1,200 μm, the adhesive layers had a total thickness of 500 μm, and the laminate (2) had a thickness of 1,700 μm. A bending strength evaluation was performed by setting the direction of 0° in the 150-millimeter length direction.

The results are shown in Table 2.

Example 3

(Preparation of Constraining Layer)

The same impregnation solution (1) as that of Example 1 was prepared as an impregnation solution.

Separately, "TORAYCA" (trademark) manufactured by Toray Industries, Inc. (T700SC-12000, reinforcing fiber density: 1.8 g/cm$^2$) was used as reinforcing fibers, and a predetermined number of the fibers were arranged in a direction of +45° or −45° so that a +45° layer had a weight of 400 g/m$^2$ and a −45° layer had a weight of 100 g/m$^2$. The layers were stitched with a polyester thread by chain stitching to produce a carbon fiber base material (3a) having a weight of 500 g/m². In addition, a predetermined number of the fibers were similarly arranged in the direction of −45° or +45° so that a −45° layer had a weight of 400 g/m² and a +45° layer had a weight of 100 g/m². The layers were stitched with the polyester thread by chain stitching to produce a carbon fiber base material (3b) having a weight of 500 g/m².

The carbon fiber base materials (3a) and (3b) were impregnated with the impregnation solution (1), and the solvent was volatilized with a dryer. Thus, prepregs (3a) and (3b) each having a resin component content of 35 weight % were produced.

The resultant two prepregs (3a) and (3b) were laminated so that their layers each having a weight of 100 g/m² faced inward, followed by pressing at 80° C. and 0.2 MPa for 30 seconds. Thus, a constraining layer (3) was obtained.

(Production of Laminate)

One sheet of release paper of the double-sided adhesive tape (1) obtained in Production Example 1 was peeled, and the remainder was bonded to the constraining layer (3). Thus, a laminate (3) was obtained.

The constraining layer (3) had a thickness of 1,200 μm, the adhesive layers had a total thickness of 500 μm, and the laminate (3) had a thickness of 1,700 μm. A bending strength evaluation was performed by setting the fiber direction of each of the layers each having a weight of 400 g/m² in the 150-millimeter length direction.

The results are shown in Table 2.

Example 4

(Preparation of Constraining Layer)

The same impregnation solution (1) as that of Example 1 was prepared as an impregnation solution.

Separately, "TORAYCA" (trademark) manufactured by Toray Industries, Inc. (T700SC-12000, reinforcing fiber density: 1.8 g/cm³) was used as reinforcing fibers, and a predetermined number of the fibers were arranged in a direction of 0° or +90° to form a layer so that the layer had a weight of 250 g/m². The layers were stitched with a polyester thread by chain stitching to produce a carbon fiber base material (4) having a weight of 500 g/m².

The carbon fiber base material (4) was impregnated with the impregnation solution (1), and the solvent was volatilized with a dryer. Thus, a prepreg (4) having a resin component content of 35 weight % was produced.

The two prepregs (4) thus obtained were laminated, and were pressed at 80° C. and 0.2 MPa for 30 seconds to provide a constraining layer (4).

(Production of Laminate)

One sheet of release paper of the double-sided adhesive tape (1) obtained in Production Example 1 was peeled, and the remainder was bonded to the constraining layer (4). Thus, a laminate (4) was obtained.

The constraining layer (4) had a thickness of 1,200 μm, the adhesive layers had a total thickness of 500 μm, and the laminate (4) had a thickness of 1,700 μm. A bending strength evaluation was performed by setting the direction of 0° in the 150-millimeter length direction.

The results are shown in Table 2.

Example 5

(Preparation of Constraining Layer)

The same impregnation solution (1) as that of Example 1 was prepared as an impregnation solution.

Separately, "TORAYCA" (trademark) manufactured by Toray Industries, Inc. (T700SC-12000, reinforcing fiber density: 1.8 g/cm³) was used as reinforcing fibers, and a predetermined number of the fibers were arranged in a direction of +45° or +90° so that a +45° layer had a weight of 400 g/m² and a +90° layer had a weight of 100 g/m². The layers were stitched with a polyester thread by chain stitching to produce a carbon fiber base material (5a) having a weight of 500 g/m². In addition, a predetermined number of the fibers were similarly arranged in the direction of −45° or +90° so that a −45° layer had a weight of 400 g/m² and a +90° layer had a weight of 100 g/m². The layers were stitched with the polyester thread by chain stitching to produce a carbon fiber base material (5b) having a weight of 500 g/m².

The carbon fiber base materials (5a) and (5b) were impregnated with the impregnation solution (1), and the solvent was volatilized with a dryer. Thus, prepregs (5a) and (5b) each having a resin component content of 35 weight % were produced.

The resultant two prepregs (5a) and (5b) were laminated so that their layers each having a weight of 100 g/m² faced inward, followed by pressing at 80° C. and 0.2 MPa for 30 seconds. Thus, a constraining layer (5) was obtained.

(Production of Laminate)

One sheet of release paper of the double-sided adhesive tape (1) obtained in Production Example 1 was peeled, and the remainder was bonded to the constraining layer (5). Thus, a laminate (5) was obtained.

The constraining layer (5) had a thickness of 1,200 μm, the adhesive layers had a total thickness of 500 μm, and the laminate (5) had a thickness of 1,700 μm. A bending strength evaluation was performed by setting the direction of +45° in the 150-millimeter length direction.

The results are shown in Table 2.

Comparative Example 1

100 Parts by weight of a bisphenol A-type epoxy resin (product name: "EPICOAT #828", epoxy equivalent=180 g/eq, manufactured by Japan Epoxy Resin Co., Ltd.), 30 parts by weight of an acrylonitrile-butadiene rubber (product name: "NBR 1042", manufactured by Zeon Corporation), 100 parts by weight of talc, 100 parts by weight of calcium carbonate, carbon black (product name: "ASAHI #50", manufactured by Asahi Carbon Co., Ltd.), and 50 parts by weight of a styrene-butadiene rubber (product name: "TUFDENE 2003", manufactured by Asahi Kasei Corporation) were kneaded with a mixing roll heated to 120° C. After that, the kneaded product was cooled to from 50° C. to 80° C. 5 Parts by weight of a curing agent (dicyandiamide, OMICURE 5, manufactured by CVC Specialty Chemicals, Inc.), 5 parts by weight of a curing accelerator (DCMU, 3-(3,4-dichlorophenyl)-1,1-dimethylurea, manufactured by Hodogaya Chemical Co., Ltd.), 30 parts by weight of a vulcanizing agent (fine powder sulfur), 5 parts by weight of a vulcanization aid (zinc oxide), 10 parts by weight of another vulcanization aid (2-mercaptobenzothiazole), and 3 parts by weight of a foaming agent (4,4'-oxybis(benzenesulfonyl hydrazide)) were further added to the kneaded product, and the mixture was kneaded with the mixing roll to prepare a resin composition.

Next, the resin composition was rolled into a thickness of 1.0 mm with a press forming machine to form a resin layer. After that, a resin-impregnated glass cloth having a thickness of 0.2 mm was bonded as a reinforcing layer to the resin layer, and release paper was bonded to the surface of the resin layer opposite to the surface having bonded thereto the reinforcing layer. Thus, a laminate (C1) was obtained.

The laminate (C1) had a thickness of 1,200 μm.

The results are shown in Table 2.

TABLE 2

|  | Example 1 | Example 2 | Example 3 | Example 4 | Example 5 | Comparative Example 1 |
|---|---|---|---|---|---|---|
| Maximum bending strength (kN) | 0.691 | 0.467 | 0.694 | 0.665 | 0.821 | 0.140 |
| Displacement at time of maximum bending strength (mm) | 20.1 | 9.6 | 16.9 | 16.5 | 17.5 | 8.9 |

INDUSTRIAL APPLICABILITY

The laminate of the present invention maybe utilized by being bonded to, for example, the outer plates and skeletons of various kinds of industrial equipment, such as transportation equipment.

The invention claimed is:

1. A laminate, comprising:
an adhesive layer; and
a constraining layer,
wherein the constraining layer includes an impregnated layer obtained by impregnating a multilayer base material, which is obtained by laminating a plurality of reinforcing fiber sheet-shaped products in each of which reinforcing fiber yarns are arranged in parallel and knitting the products with a stitching thread to integrate the products, with a thermosetting resin composition,
wherein the plurality of reinforcing fiber sheet-shaped products in the multilayer base material include a reinforcing fiber sheet-shaped product layer (1) and a reinforcing fiber sheet-shaped product layer (2) in which lengthwise directions of the reinforcing fiber yarns are different from lengthwise directions of the reinforcing fiber yarns that the reinforcing fiber sheet-shaped product layer (1) has by 30° or more, and the reinforcing fiber sheet-shaped product layer (1) has a weight equal to or more than a weight of the reinforcing fiber sheet-shaped product layer (2), and
wherein a weight ratio between the reinforcing fiber sheet-shaped product layer (1) and the reinforcing fiber sheet-shaped product layer (2) is from 9:1 to 5:5.

2. The laminate according to claim 1, wherein the reinforcing fiber yarns are at least one kind selected from carbon fiber yarns, glass fiber yarns, and resin fiber yarns.

3. The laminate according to claim 1, wherein the lengthwise directions of the reinforcing fiber yarns of the reinforcing fiber sheet-shaped product layer (2) form an angle of from 30° to 150° with respect to the lengthwise directions of the reinforcing fiber yarns that the reinforcing fiber sheet-shaped product layer (1) has.

4. The laminate according to claim 1, wherein the adhesive layer contains an epoxy-based resin.

5. The laminate according to claim 4, wherein the epoxy-based resin contains a rubber-modified epoxy resin.

6. The laminate according to claim 4, wherein the adhesive layer contains a urea-based compound.

7. The laminate according to claim 1, wherein the thermosetting resin composition contains an epoxy-based resin.

8. The laminate according to claim 7, wherein the epoxy-based resin is a combination of a bisphenol A epoxy resin and a novolac epoxy resin.

9. The laminate according to claim 8, wherein a content ratio between the bisphenol A epoxy resin and the novolac epoxy resin is from 90:10 to 10:90 in terms of weight ratio.

10. The laminate according to claim 1, wherein the adhesive layer is substantially free of a foaming agent.

11. The laminate according to claim 1, wherein the adhesive layer has a thickness of from 0.4 mm to 3 mm.

12. The laminate according to claim 1, wherein the constraining layer has a thickness of from 0.05 mm to 2 mm.

13. The laminate according to claim 1, wherein the impregnated layer is a prepreg.

* * * * *